(12) United States Patent
Morong

(10) Patent No.: US 8,493,893 B2
(45) Date of Patent: Jul. 23, 2013

(54) SINGLE-TRANSFORMER FULL-DUPLEX DIGITAL ISOLATOR

(75) Inventor: William H. Morong, Paoli, PA (US)

(73) Assignee: CogniPower, LLC, Malvern, PA (US)

( * ) Notice: Subject to any disclaimer, the term of this patent is extended or adjusted under 35 U.S.C. 154(b) by 0 days.

(21) Appl. No.: 13/340,546

(22) Filed: Dec. 29, 2011

(65) Prior Publication Data

US 2012/0250588 A1 Oct. 4, 2012

Related U.S. Application Data

(60) Provisional application No. 61/516,127, filed on Mar. 30, 2011.

(51) Int. Cl.
*H04L 5/14* (2006.01)

(52) U.S. Cl.
USPC .......................................................... 370/276

(58) Field of Classification Search
USPC ........................ 370/276–296, 535; 379/93.06
See application file for complete search history.

(56) References Cited

U.S. PATENT DOCUMENTS

2004/0239487 A1* 12/2004 Hershbarger ............ 340/310.07
2008/0031286 A1* 2/2008 Alfano et al. .................. 370/535

* cited by examiner

*Primary Examiner* — Mark Rinehart
*Assistant Examiner* — Mang Yeung
(74) *Attorney, Agent, or Firm* — Mendelsohn, Drucker & Associates, P.C.; Steve Mendelsohn

(57) ABSTRACT

The present invention provides a single transformer full-duplex digital isolator whereby two digital data streams may simultaneously be transmitted and received in opposite directions of propagation through a single transformer.

4 Claims, 3 Drawing Sheets

SINGLE-TRANSFORMER FULL-DUPLEX DIGITAL ISOLATOR

CROSS-REFERENCE TO RELATED APPLICATIONS

The present application claims the benefit of U.S. Provisional Application Nos. 61/516,127 filed on Mar. 30, 2011, which is incorporated herein by reference.

STATEMENT REGARDING FEDERALLY SPONSORED RESEARCH OR DEVELOPMENT

The present invention was not developed with the use of any Federal Funds, but was developed independently by the inventors.

BACKGROUND OF THE INVENTION

It is often desirable to pass a digital data stream across a galvanic isolation barrier. For example, the upper switch of an IGBT half-bridge may require a gate signal that cannot be ground-related, but may need to be driven at a common-mode potential of one or more kilo-volts. Numerous and varied devices such as optocouplers and transformers have been applied to accomplish this task. A modern example of such a digital isolator is the Analog Devices ADuM1100.

It is also often desirable to pass a digital data stream bidirectionally across a galvanic isolation barrier. U.S. Pat. No. 7,773,733 exemplifies such bidirectional transmission. This patent teaches the use of a single transformer to pass half-duplex bidirectional digital signals, i.e., the signals may pass in only one direction at a time.

Sometimes full-duplex operation is needed, for example telephone signals are almost always simultaneously bidirectionally transmitted. For this purpose, so-called hybrid or bridge coils have been used on telephone lines for over a century. In a typical telephone application, each telephone comprises such a coil, each of which usually has three or more windings. Thus the entire connection requires two hybrid coils, one at each end of the connection. Similar means have been used for full-duplex digital transmission, as is taught in U.S. Pat. No. 3,936,602. Such complex magnetics have not proved advantageous for modern digital full-duplex transmission. The Analog Devices ADuM1201 digital isolator is a modern device providing full-duplex digital isolation, employing two transformers, one for each direction of transmission.

Since an IGBT may dissipate excess power if not fully saturated, a desaturation fault signal is commonly passed across the galvanic isolation barrier in the opposite direction from the signal operating its gate. Using half-duplex operation for this transmission incurs complexities to avoid collision of gate data signals and fault signals. To minimize both galvanic barrier capacitance and cost, it is desirable to attain full-duplex transmission with a single, simple transformer.

BRIEF DESCRIPTION OF THE INVENTION

The present invention provides a single transformer full-duplex digital isolator whereby two digital data streams may simultaneously be transmitted and received in opposite directions of propagation through a single transformer. The present invention may also provide an IGBT or FET driver incorporating full-duplex communication through a single transformer.

Two circuits are galvanically isolated and coupled through a transformer. Each circuit includes a pulse generator responsive to signal transitions. Signals from one circuit can be transferred to the second circuit, and signals from the second circuit can be transferred to the first circuit. Signals can be transferred from each circuit to the other simultaneously.

DETAILED DESCRIPTION OF THE INVENTION

Figure 1:
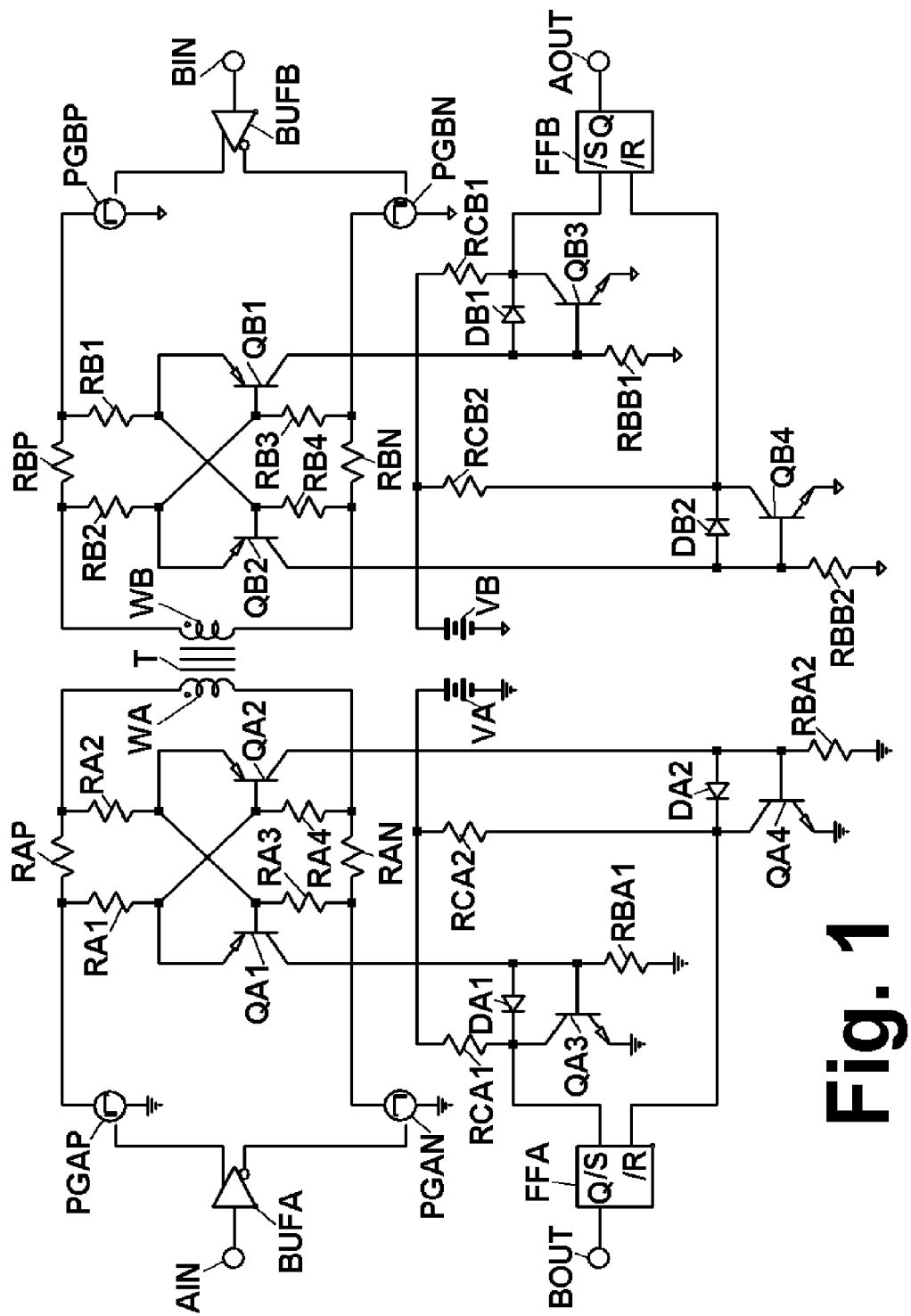
FIG. 1 shows a single-transformer, full-duplex digital isolator according to the present invention.

Referring first to FIG. 1, there is depicted a single-transformer full-duplex digital isolator according to the present invention. A data input signal AIN is applied to a complementary output buffer BUFA, The positive transition to a logic "1" of AIN, through the BUFA non-inverting output, drives a first pulse generator PGAP to produce a first negative pulse, preferably falling from +5V to 0V, having a duration of about 250 nS. A rising current from a pulse generator PGAN, presently resting at +5V, flows through a resistor RAN, preferably about 25 ohms, thence through a first winding WA of a transformer T, thence through a resistor RAP, preferably about 25 ohms, into pulse generator PGAP. This current ceases to rise and begins to decay when the 250 nS pulse of PGAP ends.

The term "full duplex" means that independent signals from each side of the transformer can be transmitted across the transformer and received by the circuit on the other side simultaneously.

Note that if FIG. 1 the circuit on the left side of the transformer is galvanically isolated from the circuit on the right side of the transformer. The term galvanically isolated means any form of barrier that prevents the passage of charge-carrying particles from one side to the other side of the barrier, and includes any isolator that permits digital information to pass through while blocking the passage of charged particles. As shown in FIG. 1, the transformer provides a galvanic barrier: signals can pass through barrier magnetically, but since the two circuits on either side of the transformer to not share a common ground or common power supply, no charge can pass from the first circuit to the second circuit.

This rising current induces into a second winding WB of transformer T a voltage which causes a current to flow from a pulse generator PGBP through a resistor BPR, preferably about 25 ohms, thence through winding WB, thence through a resistor RBN, preferably about 25 ohms, into pulse generator PGBN.

The voltage induced into winding WB also sources a current in RB4, preferably about 464 ohms, a portion of which flows through a resistor RB1, preferably about 1.0 Kohm, thence through resistor RBP to winding WB. The remainder of the RB4 current enters the emitter of a transistor QB1, preferably type MMBT3906 from the collector of which some current flows into a resistor RBB1, some flows into the base of a transistor QB3, preferably type MMBT3904, and the remainder flows into the anode of a, preferably Schottky, diode DB1. The current into its base turns QB3 ON, drawing current through a resistor RCB1 from VB, an isolated 5 volt supply of ordinary character. The voltage at QB3 collector drops until it is clamped by anti-saturation diode DB1 at about 0.4V. This collector voltage constitutes a logic "0" at a /S input of an R-S bistable FFB, causing its Q output to rise, and outputting at a data output terminal AOUT an isolated replica of the transition at input AIN to which it has responded.

The voltage induced in winding WB sources a third current through RBN, thence through a resistor RB3, preferably about 1.0 Kohm, largely returning through a resistor RB2, preferably about 464 ohms, to winding WB. The minuscule base current of QB1 also flows through RB2 into winding WB.

Generator PGBP and PGBN being low impedances, move but insignificantly, save in response to their own inputs. Thus, at the positive transition of AIN the dotted end of WB moves negative and the undotted end moves positive. This movement causes the emitter of QB1 to move positive with respect to its base, giving rise to its aforementioned emitter current. At this time, another transistor QB2 is also subjected to a voltage difference between its base and emitter, but of the opposite polarity, which engenders essentially no conduction therein.

When the data at input AIN returns to a logic "0", a pulse generator PGAN falls from 5V to 0V, just as generator PGAP previously did responsive to the previous positive data transition. Now current flows through the aforementioned circuit comprising winding WA in an opposite direction and an opposite voltage is induced into winding WB. Since the circuit to the right of WB is symmetrical, the evenly and oddly numbered corresponding components located their exchange function from that previously described for them, and transistor QB2 is turned ON. Its collector current flows partly in a resistor RBB2, turns ON a transistor QB4, which draws current through a resistor RCB2, producing a logic low at its collector which, being clamped by a diode DB2, is applied to a /R input of R-S bistable circuit FFB, causing its Q output to fall, and outputting at a data output terminal AOUT an isolated replica of the transition at input AIN to which it has responded.

Since this isolator is entirely symmetrical on either side of transformer T, exercising isolated data input BIN produces at non-isolated terminal BOUT a replica of the data applied to BIN. The functions of all components on the right side of transformer T having "B" labels are exchanged with those on the left side of transformer T having "A" labels.

Thus far the transmission of data in both directions has been explained. It is now necessary to explain what occurs when these data occur near simultaneously. When generator PGAP fell, the voltage at the dotted end of winding WA also fell, but it fell by less due to voltage division. The series elements of the voltage divider operating are resistors RAP and RAN, and the shunt elements are the reflections of resistors RBP and RBN in series with generators PGBP and PGPN. Like their corresponding B-labeled resistors, RA1 through RA4 form a pair of unequal voltage dividers. The ratios of these dividers has been selected such that the fall of either generator PGAP or PGAN produces insignificant differential voltage occurs between their center nodes. Two transistors, QA1 and QA2, which like their counterparts QB1 and QB2 turn on responsive to properly poled base-emitter voltage differences, thus ignore pulses from generators PGAP and PGAN. Transistors QA1 and QA2 do however respond to pulses from PGBP and PGAN, turning on transistors QA3 or QA4, and toggling bistable FFA responsively thereto. Diodes DA1 and DA2, resistors RBA1, RBA2, RCA1, and RCA2 all perform analogously to their symmetrical counterparts associated with winding WB of transformer T. Whether the generator pulses associated with the data being transmitted from AIN to AOUT and from BIN to BOUT are separated, are superimposed, or overlap, the states of outputs AOUT and BOUT correspond to the states of their respective inputs, without being delayed for, and regardless of the state of, data flowing in the opposite direction. The network comprising resistors RAP, RAN, and RA1 through RA4, and the network comprising resistors RBP, RBN, and RB1 through RB4, are called unilateral networks. Unilateral networks respond to signals impressed by pulse generators driving the side of the transformer from which they are isolated whilst largely rejecting signals from pulse generators driving the side of the transformer with which they are galvanically connected. While the preferred embodiment here describes uses passive networks to cancel non-isolated responses, this invention may also be practiced by effecting cancellation based on a pulse generator producing oppositely poled pulses.

Transistors QA1 through QA4 and QB1 through QB4 constitute two pairs of differential receiver circuits, oppositely poled within each pair, with each pair providing a pulse associated with each direction of data transition. These simple receivers can be replaced by pairs of comparators to practice this invention. Since the Vbe of the transistors makes them insensitive to signals of less than a few hundred millivolts, suitable offsets should be applied to any comparators thus used.

This embodiment uses 5V supplies and a 1:1 transformer ratio, but this invention may be practiced with other voltages, and with suitable adjustments of divider resistances to transformer ratios other than 1:1. When being used for communication with an IGBT, the "A" to "B" path might be used for gate drive data and the "B" to "A" path for faults, in which case it may be desirable to omit bistable FFA and communicate faults as pulses, in which case it may also be desirable to omit buffer BIN and use each polarity of pulse to communicate a separate fault condition.

Figure 2:
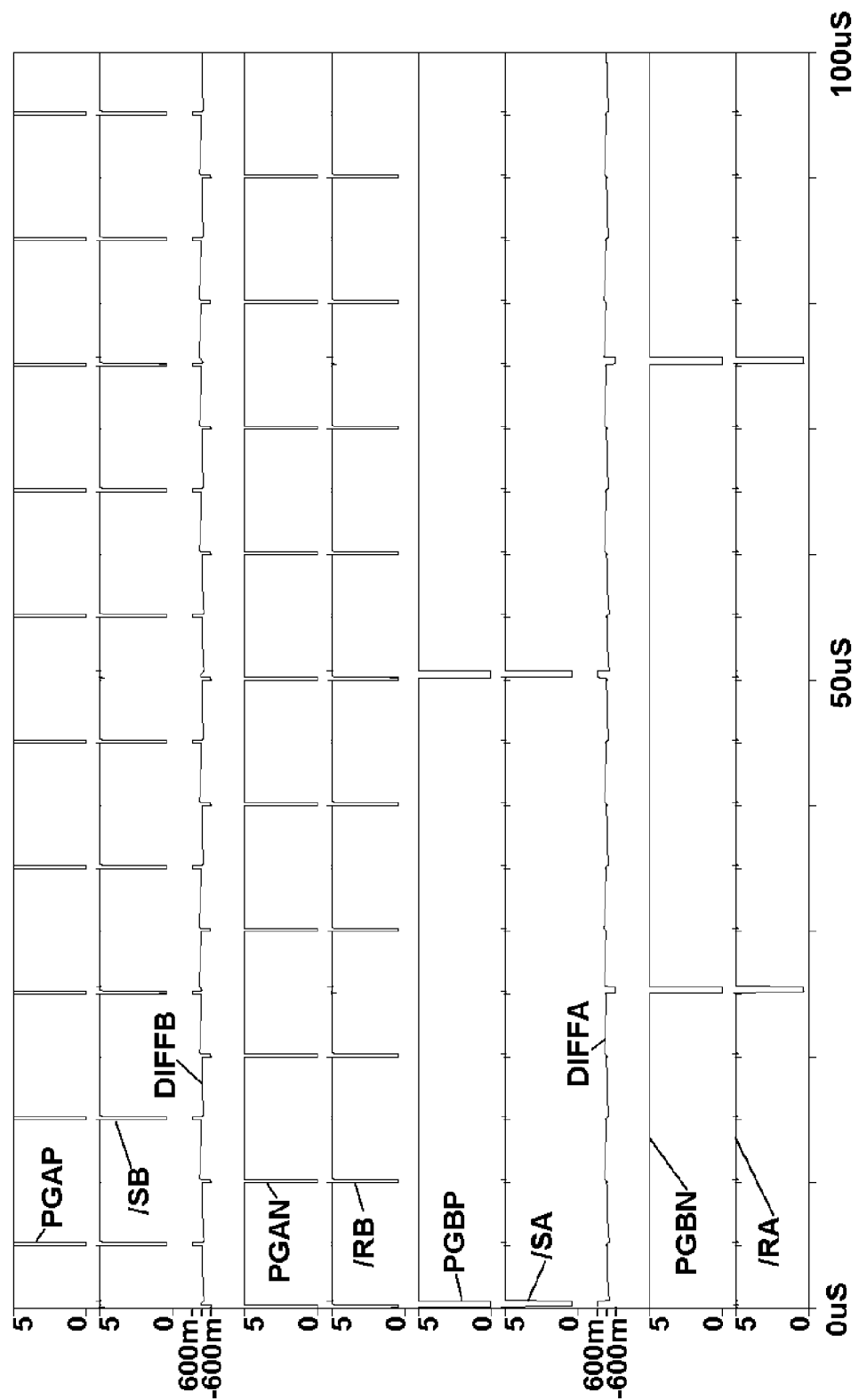
FIG. 2 shows SPICE-generated waveforms from the circuit of FIG. 1.

FIG. 2 shows SPICE-generated waveforms from the circuit of FIG. 1. When generator PGAP pulses, a corresponding positive-going differential pulse on signal DIFFB appears between the bases of QB1 and QB2, turning on QB3 to generate the pulse /SB at the /S input of bistable FFB. In like manner, a PGAN pulse produces and oppositely poled differential pulse, turning on Q4 to generate a /R pulse at bistable FFB. Thus FFB is set and reset respectively to reconstitute at the AOUT terminal of the circuit of FIG. 1 the data applied to its AIN terminal. The B-side network of that circuit largely rejects generator signals from the same side but, rejection being less than perfect at all frequencies, tiny spike-shaped remnants of B-side generator signals may be seen at 25, 50, and 75 uS of time. In like manner, generator PGBP produces the signal /SA at bistable FFA, and generator PGBN produces the signal /RA. The differential A-side signal DIFFA acts analogously to signal DIFFB. The imperfections of high-frequency A-side rejection may be observed every 5 uS on signal /SA and /RA. It should be noted that signals DIFFA and DIFFB have approximately 600 mV peaks. These peaks are clipped by Vbe conduction in QA1, QA2, QB1, and QB2, and would otherwise be about 1.2V high. In the circuit of FIG. 1, the Vbe's of these transistors are employed to reject baseline noise from imperfect rejection.

Figure 3:
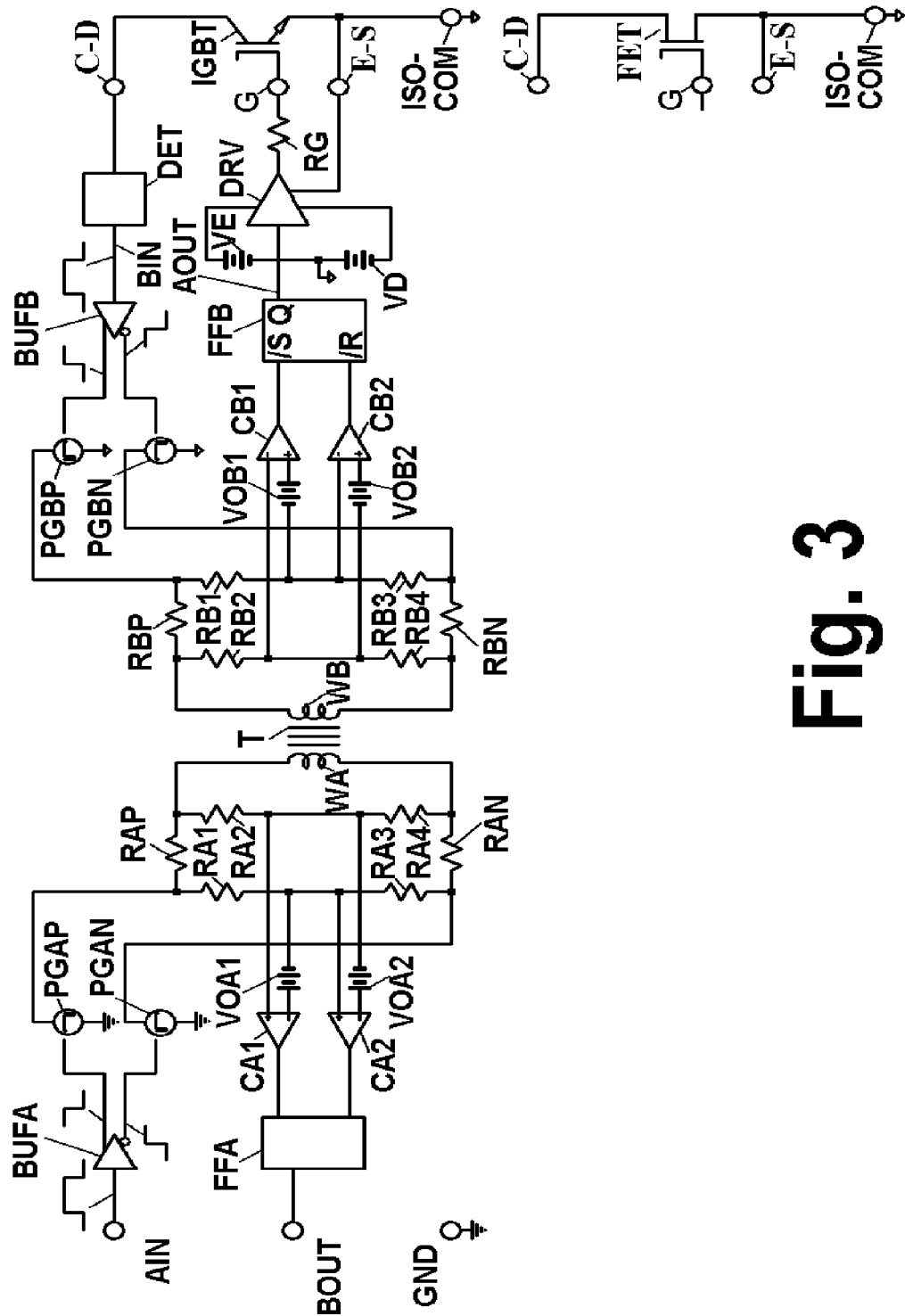
FIG. 3 shows a simple IGBT or FET isolated drive with full-duplex transmission according to the present invention.

FIG. 3 depicts a simple IGBT or FET isolated driver with full-duplex transmission of both IGBT or FET ON data in a forward direction and IGBT or FET fault data, or other data, in the opposite direction. In this circuit, all of the components which are labeled as in FIG. 1 correspond to those same components. Here comparators CA1, CA2, CB1, and CB2, with their offset voltages VOA1, VOA2, VOB1, and VOB2, respectively perform the same function as transistors QA1-QA4 and QB1-QB4. There is no functional difference between the isolator of this figure and that of FIG. 1. In this figure, the data from a terminal AIN, having been transmitted in a forward direction to isolator output AOUT, is applied to a driver DRV which derives its power from a pair of floating voltage sources VE and VD. The output of driver DRV is limited by a resistor RG as it passes through a terminal G to the gate of an IGBT, IGBT, or FET, FET. To a collector of the IGBT, or drain of the FET, C-D, is connected a de-saturation detector DET, the output of which may indicate a de-saturation fault which is transmitted in a reverse direction to a terminal BOUT. An emitter or source, E-S of the IGBT or FET is connected through an isolated-common terminal ISO-COM to the common terminal of sources VE and VD. It should be noted that this isolated common is depicted by a different symbol than the ground on the A-side of the isolator, from which it is galvanically isolated by transformer T.

It should be noted that though a simple two-winding transformer has been depicted in FIGS. 1 and 3, this invention may also be practiced by incorporating into an isolator a cascade of transformers to effect a single coupling between two galvanically isolated circuits. Whether a single transformer or a cascade of transformers is used, such coupling within an isolator is hereinbelow referred to as a single transformer coupling.

The invention claimed is:

1. A full-duplex digital isolator comprising:
a transformer with a first side and a second side magnetically coupled to each other, the first side and second side being galvanically isolated from each other;
a first electrical circuit attached to the first transformer side comprising a first pulse generator responsive to signal transitions;
a second electrical circuit attached to the second transformer side, the second electrical circuit being galvanically isolated from the first electrical circuit and comprising both (i) a second pulse generator responsive to signal transitions and (ii) at least one of a differential receiver and a comparator;
wherein:
the isolator is configured to transfer a first signal across the transformer from the first electrical circuit to the second electrical circuit,
the isolator is configured to transfer a second signal across the transformer from the second electrical circuit to the first electrical circuit; the isolator being configured to transfer the first and second signals simultaneously; and
at least one of the electrical circuits comprises a unilateral network and a differential receiver configured to reject signals from the same transformer side to which the unilateral network is connected.

2. The isolator of claim 1 wherein at least one of the electrical circuits comprises a bistable circuit.

3. The isolator of claim 1 wherein at least one of the electrical circuits comprises an insulated-gate bipolar transistor (IGBT) or field-effect transistor (FET).

4. The isolator of claim 1 wherein the transformer is the only transformer in the isolator.

* * * * *